Patented Jan. 13, 1942

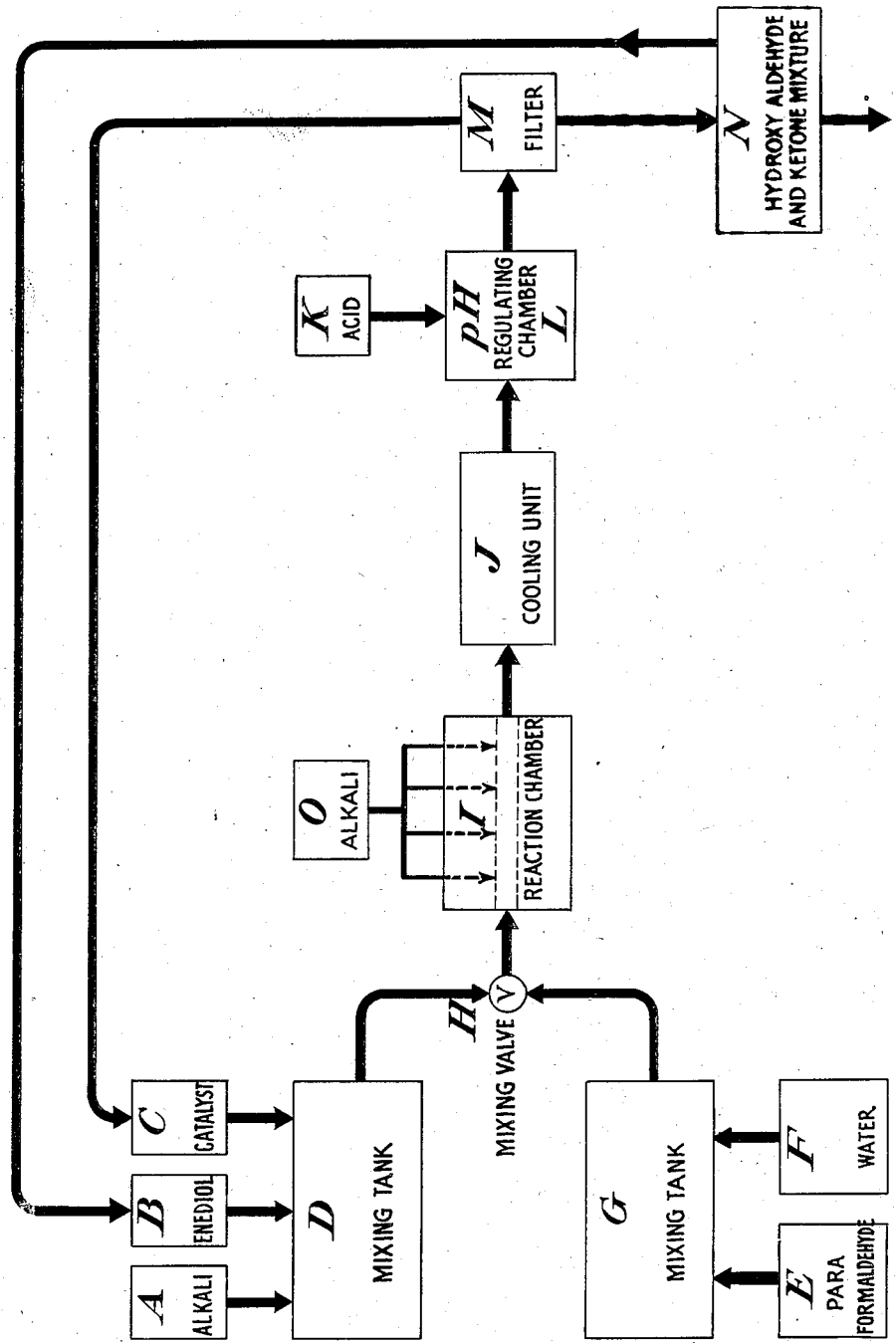

2,269,935

UNITED STATES PATENT OFFICE 2,269,935

PROCESS FOR PRODUCING HYDROXY ALDEHYDES AND HYDROXY KETONES

William E. Hanford and Richard S. Schreiber, Wilmington, Del., assignors to E. I. du Pont de Nemours & Company, Wilmington, Del., a corporation of Delaware Application February 27, 1940, Serial No. 320,988

10 Claims. (Cl. 260—594)

This invention relates to the continuous single phase process for converting formaldehyde to hydroxy aldehydes and hydroxy ketones.

It is well known that in the self-condensation of formaldehyde there are two competing reactions: one yielding hydroxy aldehydes and hydroxy ketones, and the other a Cannizzaro reaction involving the formation of formic acid and methanol. O. Loew (J. Prakt. Chem. 34, 51 (1886)), one of the earliest workers in this field, states that a considerable amount of formic acid and methanol are formed if the formaldehyde concentration exceeds 1 to 2 per cent, regardless of the procedure or catalyst used. Other workers in this field have stated that the Cannizzaro reaction predominates when the formaldehyde concentration exceeds 4 to 5 per cent. Processes involving such low concentrations are not economical, and hence of no practical value. The substitution of methanol for water has been one of the expedients suggested for inhibiting the Cannizzaro reaction and increasing the yield of desired condensation products. In alcoholic media formaldehyde has been successfully condensed to hydroxy aldehydes and hydroxy ketones in concentrations exceeding 5 per cent. This expedient is not a practical solution to the problem (1) for economic reasons since it involves replacement of a cheap solvent by a relatively expensive solvent, (2) because it introduces complicating side reactions, e. g., acetal and ether formation, and (3) because the condensation reaction goes faster in water than in alcohol.

W. E. Hanford and R. S. Schreiber in their copending application, Serial No. 226,730, filed Aug. 25, 1938, describe a process for condensing formaldehyde in aqueous media in concentrations exceeding 8 per cent to give high yields of hydroxy aldehydes and hydroxy ketones. The preferred method described in said application is a batchwise operation and, while it has the advantage that sufficient time may be allowed for the formaldehyde to reach the desired degree of condensation, it has the disadvantage that the method is discontinuous and hence more costly than if the equipment could be kept in constant use. In order to operate a continuous process, however, the catalyst must be in solution during the reaction. Soluble catalysts of the prior art that had been used in carrying out the condensation of formaldehyde solutions of less than 5% concentrations were found to be inoperative with the higher concentrations of formaldehyde.

It is accordingly an object of this invention to provide a practical process for condensing formaldehyde by a continuous single phase flow method. A further object is the continuous single phase conversion of formaldehydes to hydroxy aldehydes and hydroxy ketones. Another object is to solubilize a catalyst selected from the elements of group IV of the periodic table so as to obtain a homogeneous solution. A still further object is the continuous single phase conversion of formaldehyde to high yields of low molecular weight hydroxy aldehydes and hydroxy ketones. Other objects will be apparent from the reading of the following description of the invention.

These objects are accomplished by one or more of the steps of the process which comprise dissolving a compound of an element of group IV of the periodic table having an atomic number in the range of 50 to 90 in an enediol solution having a pH of about 5 or more, adding said solution to an aqueous formaldehyde solution of at least 8% formaldehyde concentration, and condensing the resulting mixture by heat treatment so as to convert the formaldehyde to hydroxy aldehydes and hydroxy ketones, stopping the conversion when the desired degree of condensation has been obtained and removing the catalyst, and recovering the hydroxy aldehydes and hydroxy ketones.

The invention may best be understood by reference to the accompanying drawing which is a flow sheet of a preferred embodiment of this invention. Referring to the drawing tanks A, B, and C contain respectively a solution of a caustic alkali, enediols, and a catalyst. These three components are allowed to flow into the mixing tank D in such proportions that when they are properly admixed there will be complete solution of the catalyst. This solution is allowed to flow to tank H where it becomes admixed with a formaldehyde compound—water solution from tank G. Tank G is a mixing tank which receives formaldehyde compound from tank E and water from tank F in ratios so as to obtain the desired concentration of formaldehyde compound and water. The resulting mixture from tank H then passes through the reaction chamber I at such a rate as to insure the desired degree of condensation under the conditions of operation of said chamber. The reaction mixture may then be cooled by passing through a cooling unit J. From the cooling unit J the mixture may pass into the chamber L where it is admixed with an acid supplied from tank K. This acid is added in such an amount as to cause precipitation of the catalyst, which catalyst is removed by the filter M and recycled to tank C. The solution of hydroxy aldehydes and hydroxy ketones passes from the filter M to the storage tank N. Part of the solution is recycled to tank B to be used as an enediol source. The remaining solution is withdrawn for processing to recover its various desired components. If desired, a relatively constant pH may be maintained throughout the condensation by continuous or intermittent addition of alkali at a number of points in the reaction chamber as indicated in the diagram by the addition of alkali from tank O to the reaction chamber.

The following examples set forth certain well defined instances of the application of this invention. They are, however, not to be considered as limitations thereof, since many modifications may be made without departing from the spirit and scope of this invention.

*Example I*

315 g. of paraformaldehyde were dissolved in 350 g. of water by warming to 80° C. with a trace of alkali. To this formaldehyde solution was then added 30 g. of lead sulfate which had previously been solubilized by suspending in 90 cc. of a solution containing 40 g. of enediols and adding 100 cc. of 10 per cent sodium hydroxide while keeping the solution cold. This solution was then passed through a nickel coil ($\frac{3}{16}$ inch in diameter and 20 feet long and having a capacity of 75 cc.) at a rate of 4 cc. per minute while maintaining a temperature of 90° to 95° C. Under these conditions 75 per cent of the formaldehyde was condensed to hydroxy aldehydes and hydroxy ketones. The pH of the solution was then dropped to 5.0 by the addition of 2 cc. of concentrated sulfuric acid in 10 cc. of water and the solution filtered to remove the precipitated lead sulfate. On testing a portion of the filtrate with hydrogen sulfide it was found that all of the lead ions had been removed by this treatment. The pH of the solution was then raised to 7.1 by the addition of 10 per cent sodium hydroxide and a sample containing 92 g. of the condensate was hydrogenated at 120° C. with 20 g. of nickel-on-kieselguhr catalyst and at pressures of 600 to 650 atmospheres. After filtering to remove the hydrogenation catalyst, the solution, which gave a negative test for reducing substances with Fehling solution, was distilled under reduced pressure to yield the following results:

*Table I*

| Fraction | Grams | Substance | Yield* |
|---|---|---|---|
| 1 | 7.0 | Ethylene glycol | 10.0 |
| 2 | 9.1 | Glycerol | 13.0 |
| 3 | 11.5 | Erythritol | 16.5 |

*The yields are based on the formaldehyde condensed.

*Example II*

630 g. of paraformaldehyde were dissolved in 700 g. of water by warming to 80° C. with a trace of alkali. To this formaldehyde solution was added 55 g. of lead formate which had been previously solubilized by suspending in 200 cc. of a solution containing 60 g. of enediols and adding 75 cc. of 10 per cent sodium hydroxide while keeping the solution cold. This mixture was then passed through the nickel coil as described above at the rate of 1.7 cc. per minute, while maintaining a temperature of 95° C. Under these conditions 72 per cent of the formaldehyde was polymerized to a mixture of hydroxy aldehydes and hydroxy ketones. The pH of the reaction mixture was then lowered to 4.0 by the addition of 4 cc. of a concentrated sulfuric acid in 10 cc. of water. A 240 cc. sample of this material which contained 90 g. of condensate was hydrogenated with 20 g. of nickel-on-kieselguhr catalyst in the manner described in Example I. After removal of the hydrogenation catalyst by filtration, the hydrogenated solution was distilled under reduced pressure to yield the following results:

*Table II*

| Fraction | Grams | Substance | Yield* |
|---|---|---|---|
| 1 | 19.0 | Methanol | 21.0 |
| 2 | 8.8 | Ethylene glycol | 13.0 |
| 3 | 14.5 | Glycerol | 22.5 |
| 4 | 7.0 | Erythritol | 10.7 |

*The yields are based on the formaldehyde condensed.

*Example III*

316 g. of paraformaldehyde were dissolved in 350 g. of water by warming to 80° C. with a trace of alkali. To this formaldehyde solution was then added 30 g. of stannous chloride which had previously been dissolved by suspending in 100 cc. of the solution containing 125 g. of enediols and adding 250 cc. of 10 per cent sodium hydroxide while keeping the solution cold. This mixture was then passed through the reaction coil described in Example I at a rate of approximately 1.4 cc. per minute and at a temperature of 95° C. Under these conditions 87 per cent of the formaldehyde was polymerized to a mixture of hydroxyaldehydes and hydroxy ketones. Without attempting to remove the catalyst the pH was raised to 7.0 by the addition of 10 per cent sodium hydroxide and then a 215 cc. sample containing 80 g. of condensate was hydrogenated with 30 g. of Raney nickel catalyst under conditions similar to those described in Example I. After removal of the catalyst by filtration, the hydrogenated solution was distilled under reduced pressure to yield the following results:

*Table III*

| Fraction | Grams | Substance | Yield* |
|---|---|---|---|
| 1 | 10.6 | Ethylene glycol | 15.1 |
| 2 | 10.1 | Glycerol | 14.4 |
| 3 | 3.2 | Erythritol | 4.5 |

*The yields are based on the formaldehyde condensed.

*Example IV*

316 g. of paraformaldehyde were dissolved in 250 g. of water by warming to 80° C. with a trace of alkali. To this solution was then added a mixture containing 30 g. of cerium trichloride, 100 cc. of a solution containing 40 g. of enediols and 120 cc. of 10 per cent sodium hydroxide. This solution was then passed through the reaction coil described in Example I at a rate of 0.5 cc. per minute and at a temperature of 95° C. Under these conditions 30 per cent of the formaldehyde was polymerized to a mixture of hydroxy aldehydes and hydroxy ketones.

Although in the foregoing examples paraformaldehyde has been used exclusively, it is to be understood that in the practice of this invention any form of formaldehyde or any formaldehyde derivative capable of liberating formaldehyde under the reacting conditions may be used. To depolymerize paraformaldehyde or trioxymethylene it is not essential to add an alkali as the paraformaldehyde or trioxymethylene depolymerize by merely heating at 90° C. or above for a short time. Formaldehyde solutions in which the concentration is in excess of 8 percent can be employed in this process.

The preferred catalysts for this process are lead hydroxide, lead oxide, lead formate, lead sulfate, lead oxalate, tin formate and tin chloride. In place of the preferred catalyst, however, practically any compound of lead, tin, thorium, or cerium may be used. The use of cerium chloride as a catalyst is illustrated in Example IV. The amount of catalyst required for efficient operation of this process depends to some degree on several factors such as concentration of formaldehyde, the temperature used, the hydrogen ion concentration of the mixture, the amount and type of alkali used to solubilize the catalyst and the concentration of enediols employed. While amounts of catalysts as low as 0.01 per cent may be used, it is generally preferred not to use less than 0.15 per cent based on the formaldehyde because when too small amounts are used, the reaction is sluggish and incomplete.

Although in the examples cited above, sodium hydroxide was used exclusively, any strong alkaline reacting substance will work equally well. For example, besides sodium hydroxide, potassium hydroxide, calcium hydroxide, trimethylamine, pyridine, triethylamine, and barium hydroxide can be employed with a high degree of success. Although the amount of alkali employed depends on a variety of factors such as concentration of catalyst, concentration of enediols, and temperature employed, it is generally preferred to use not less than 2 per cent based on the amount of formaldehyde used.

By "enediols" is meant compounds having the grouping

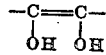

or compounds which are capable of enolizing, rearranging, or hydrolizing to give products having such grouping. Among such products are glucose, ascorbic acid, fructose, erythrose, reductone, invert sugar, and a mixture of hydroxy aldehydes and hydroxy ketones produced by condensation of formaldehyde, which consists essentially of glycolic and glyceric aldehydes, tetroses, pentoses, hexoses, along with some unchanged formaldehyde. The amounts of enediols or their equivalents which are most effective range from one to about 10 per cent, based on the formaldehyde. The use of more than 10 per cent of enediols or their equivalents usually offers no advantage.

If desired, the reaction may be initiated at temperatures from about 25° C. to about 150° C. and at pH within the range of 2.5 to 10.0. It is generally preferred, however, to operate in a pH range of 5.0 to 9.0 and at temperatures of 45° C. to 105° C. If desired, a constant pH may be maintained throughout the condensation by the continuous or intermittent addition of alkali at a number of points in the reaction chamber. In practice this is desirable since this makes it possible to exercise control on the rate of reaction throughout the condensation step and leads to products having a smaller spread in molecular weight than is otherwise possible. This modification is particularly effective for the production of high yield of low molecular weight hydroxyaldehydes such as glycolic and glyceric.

In order to produce high yields of the lower molecular weight hydroxy aldehydes and hydroxy ketones (i. e., glycolic aldehyde, glyceric aldehyde, dihydroxy acetone, erythroses, pentoses and hexoses) the condensation reaction is stopped when from 40 to 95% of the formaldehyde has been condensed, preferably 60 to 90%. This control in condensation may be obtained by regulating the flow of the reactants through the reaction zone or by stopping the reaction by acidifying the reactants or by cooling same. Any combination of these methods may also be used in preventing further reaction. Temperatures of from 0° to 15° C. have been found to be practical. In acidifying the solution any mineral acid, or strong organic acid, may be used. The use of such acids as sulfuric and oxalic are particularly practical when lead and tin compounds have been used as catalysts. These acids permit the formation of insoluble sulfates and oxalates that are easily removed by filtration. In the addition of these acids sufficient quantity of same should be added so that the pH of the solution is dropped to 5 or below. The precipitated compound is then filtered or removed by decantation or centrifuging and may be re-used.

The hydroxy aldehydes and hydroxy ketones obtained by this process may be used as intermediates in the synthesis of valuable industrial products or may be catalytically hydrogenated by any method, either batch or continuous, adaptable for the catalytic hydrogenation of unsaturated oxygen-to-carbon linkages. It is prefered, however, to carry out the hydrogenation of the products as obtained in this process by the method described in the copending application of Hanford and Schreiber, Serial No. 226,731, filed August 25, 1938.

The products obtained by this process are valuable intermediates for the preparation of polyhydroxy compounds which find extensive use as softeners for "Cellophane," as polymer ingredients, etc. The polyhydroxy aldehydes and polyhydroxy ketones may be used as such to yield polymeric products by condensing with bifunctional compounds.

This invention represents a distinct advance in the art since it provides a means for condensing formaldehyde continuously in a single phase system to hydroxy aldehydes and hydroxy ketones. Up to this time no method was available for obtaining homogeneous solutions which contained all the necessary reactants for condensing formaldehyde.

We claim:

1. A continuous process for the production of hydroxyaldehydes and hydroxy ketones which comprises dissolving a compound of an element of the 4th group of the periodic table in an enediol by maintaining the pH of the enediol in excess of 5 and adding the resulting solution to an aqueous solution of formaldehyde, passing the mixture through a reaction chamber heated to a temperature between 25° and 150° C., stopping the reaction when the desired degree of condensation is attained, and recovering the desired hydroxyaldehydes and hydroxy ketones.

2. The process in accordance with claim 1 characterized in that the pH is maintained relatively constant in the reaction chamber by the adding of alkali to the reactants as they pass through said chamber.

3. A process for the production of hydroxyaldehydes and hydroxy ketones which comprises passing in a continuous manner an aqueous solution containing at least 8% formaldehyde together with an enediol and a compound of an element of the fourth group of the periodic table through a reaction chamber heated to a temperature between 50° and 150° C.

4. The process in accordance with claim 3 characterized in that the reaction chamber is maintained at a temperature between 85° C. and 105° C.

5. The process in accordance with claim 3 characterized in that the rate of passage through the reaction chamber is adjusted so as to obtain from 45% to 95% condensation of formaldehyde.

6. A process for the production of hydroxyaldehydes and hydroxy ketones which comprises passing in a continuous manner an aqueous solution containing at least 8% formaldehyde together with an enediol and a compound of an element of the fourth group of the periodic table through a reaction chamber heated to a temperature between 50° and 150° C. and stopping the reaction when from 45% to 95% of the formaldehyde has been condensed by cooling the reaction to a temperature of 0° C. to 15° C.

7. A process for the production of hydroxyaldehydes and hydroxy ketones which comprises passing in a continuous manner an aqueous solution containing at least 8% formaldehyde together with an enediol and a compound of an element of the fourth group of the periodic table through a reaction chamber heated to a temperature between 50° and 150° C. and stopping the reaction when from 45% to 95% of the formaldehyde has been condensed by adding an acid to said reactants in an amount sufficient to reduce the pH of the solution to at least 5.0.

8. The process in accordance with claim 7 characterized in that the compound of the element of the fourth group of the periodic table is selected from the group consisting of lead and tin and the acid added to stop the reaction is selected from the group consisting of oxalic acid and sulfuric acid.

9. A continuous process for the production of hydroxyaldehydes and hydroxy ketones which comprises dissolving lead sulfate in an aqueous enediol solution by maintaining said solution at a pH of at least 7 and adding the resulting solution to an aqueous solution of formaldehyde of at least 8% concentration, passing the mixture through a reaction chamber heated to a temperature between 50° and 150° C., and stopping the reaction when from 45% to 95% of the aldehyde has been condensed by adding to the reactants sulfuric acid in an amount sufficient to reduce the pH of the solution to at least 5, separating the lead sulfate formed by precipitation and recycling same and recovering from the reaction mass hydroxyaldehydes and hydroxy ketones.

10. A continuous process for the production of hydroxyaldehydes and hydroxy ketones which comprises passing through a reaction chamber a mixture of formaldehyde in aqueous solution and enediol and a compound of an element of the fourth group of the periodic table and maintaining the pH of said solution relatively constant at a pH in excess of 5 by adding alkali to the reactants as they pass through said chamber, the process being further characterized in that the reaction chamber is operated at a temperature between 25° and 150° C.

WILLIAM E. HANFORD.
RICHARD S. SCHREIBER.